No. 693,238. Patented Feb. 11, 1902.
W. E. COFFIN.
CAR COUPLING.
(Application filed Oct. 5, 1900.)
(No Model.)
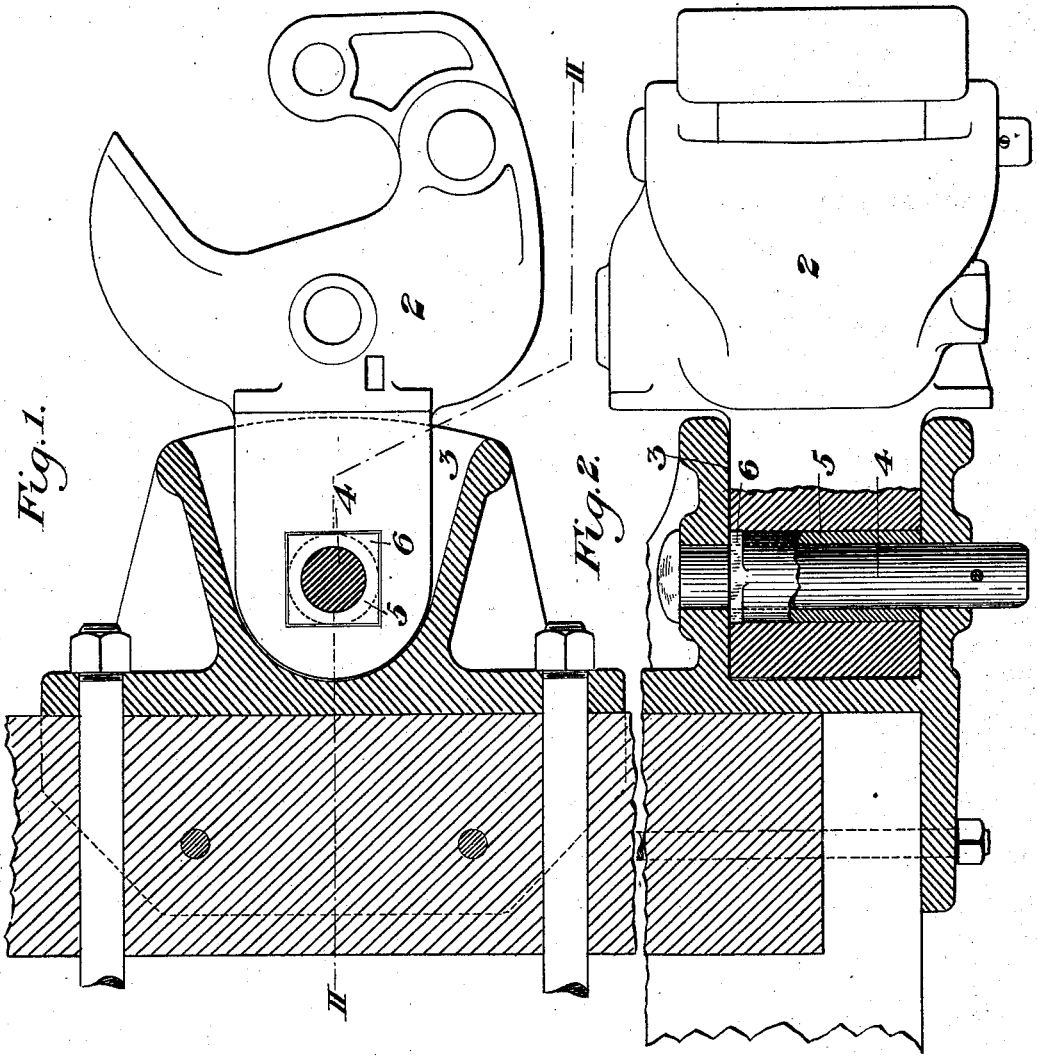
WITNESSES
INVENTOR
Walter E. Coffin
by Bakewell & Bakewell
his Attorneys.

UNITED STATES PATENT OFFICE.

WALTER E. COFFIN, OF CLEVELAND, OHIO, ASSIGNOR TO THE NATIONAL MALLEABLE CASTINGS COMPANY, OF CLEVELAND, OHIO, A CORPORATION OF OHIO.

CAR-COUPLING.

SPECIFICATION forming part of Letters Patent No. 693,238, dated February 11, 1902.

Application filed October 5, 1900. Serial No. 32,110. (No model.)

*To all whom it may concern:*

Be it known that I, WALTER E. COFFIN, of Cleveland, in the county of Cuyahoga and State of Ohio, have invented a new and useful Improvement in Car-Couplers, of which the following is a full, clear, and exact description, reference being had to the accompanying drawings, forming part of this specification, in which—

Figure 1 shows in horizontal section a car-coupler constructed in accordance with my invention. Fig. 2 is a vertical longitudinal section on the line II II of Fig. 1, and Fig. 3 is a perspective view of the bushing. Fig. 4 shows in perspective a modified construction of bushing on a smaller scale than Fig. 3.

My invention is designed to provide means for increasing the durability of car-couplers.

It has been found in the use of couplers whose shanks are pivoted in pockets and which are generally used on locomotives or tenders that the shank of the coupler rapidly wears at the pivot-pin hole, and this has been found to be a fruitful source of loss and inconvenience. I prevent this difficulty by the means described below.

In the drawings, 2 represents the coupler, the shank of which fits in a pocket 3, and 4 is the pivot-pin by which the shank is pivotally connected to the pocket. In the pivot-hole of the coupler-shank I place a bushing 5, through which the pivot-pin passes. The bushing is held from turning in the hole by providing it with a head 6 of angular form, which fits in a countersunk seat on the surface of the shank. When the bushing wears at the rear side of the pin, as it will do after it has been used for some time, the bushing can be removed, turned a quarter-revolution, and replaced, when it will present a new wearing-surface, and this can be repeated, so that it will afford several wearing-surfaces, which can be used and worn out before the bushing need be discarded and replaced. The head of the bushing being contained in a countersunk seat on the coupler-shank fits under the upper wall of the pocket and is retained in place thereby.

In Fig. 4 I show a modified construction of bushing, in which instead of providing the bushing with a square or angular head 6 the entire bushing 5' is made of angular form and is thus prevented from turning. The socket in the shank of the coupler is made in angular form, so as to fit the bushing.

The form of the bushing may be varied within the scope of my invention, since

What I claim is—

1. The combination of a coupler and a pocket arranged to receive the coupler-shank, a pivot-pin and a bushing fitting in the pivot-hole of the coupler and having an angular portion fitting a corresponding socket or recess, said angular portion being adapted to hold the bushing from turning during normal operation, but permitting it to be turned and adjusted to present a new wearing-surface.

2. The combination of a coupler and a pocket arranged to receive the coupler-shank, a pivot-pin and a bushing fitting in the pivot-hole of the coupler and having an angular portion fitting a corresponding socket or recess, said angular portion being constituted by a head on a bushing fitting an angular countersunk hole in the coupler.

In testimony whereof I have hereunto set my hand.

WALTER E. COFFIN.

Witnesses:
D. W. CALL,
C. W. HOTCHKISS.